United States Patent
Sayko et al.

(10) Patent No.: US 7,239,688 B1
(45) Date of Patent: Jul. 3, 2007

(54) METHOD, ARCHITECTURES AND TECHNIQUE FOR AUTHENTICATION OF TELEPHONE CALLS

(75) Inventors: Robert Sayko, Colts Neck, NJ (US); Martin Sliwicki, Montgomery Township, NJ (US)

(73) Assignee: AT&T Corp., New York, NY (US)

( * ) Notice: Subject to any disclaimer, the term of this patent is extended or adjusted under 35 U.S.C. 154(b) by 186 days.

(21) Appl. No.: 10/831,036

(22) Filed: Apr. 23, 2004

(51) Int. Cl.
*H04M 11/00* (2006.01)
(52) U.S. Cl. .............................. 379/93.02; 379/93.03; 379/142.05
(58) Field of Classification Search ............. 379/93.02, 379/93.03, 142.05, 93.23
See application file for complete search history.

(56) References Cited

U.S. PATENT DOCUMENTS

| | | | | |
|---|---|---|---|---|
| 5,510,777 A | * | 4/1996 | Pilc et al. ................ | 379/93.03 |
| 5,953,399 A | * | 9/1999 | Farris et al. ............. | 379/93.03 |
| 6,324,271 B1 | * | 11/2001 | Sawyer et al. ......... | 379/142.05 |
| 2004/0174965 A1 | * | 9/2004 | Brahm et al. ............ | 379/88.19 |
| 2005/0084077 A1 | * | 4/2005 | Brown et al. ............ | 379/88.01 |
| 2005/0190904 A1 | * | 9/2005 | Anupam et al. ....... | 379/142.05 |

* cited by examiner

*Primary Examiner*—Stella Woo

(57) ABSTRACT

A method and system authenticates an authenticatee and provides an authentication to a recipient. The authenticatee may be either the called party or the calling party. A network platform or customer premise equipment may be utilized to provide information for authentication. Customer premise equipment provides the authentication to the recipient.

3 Claims, 5 Drawing Sheets

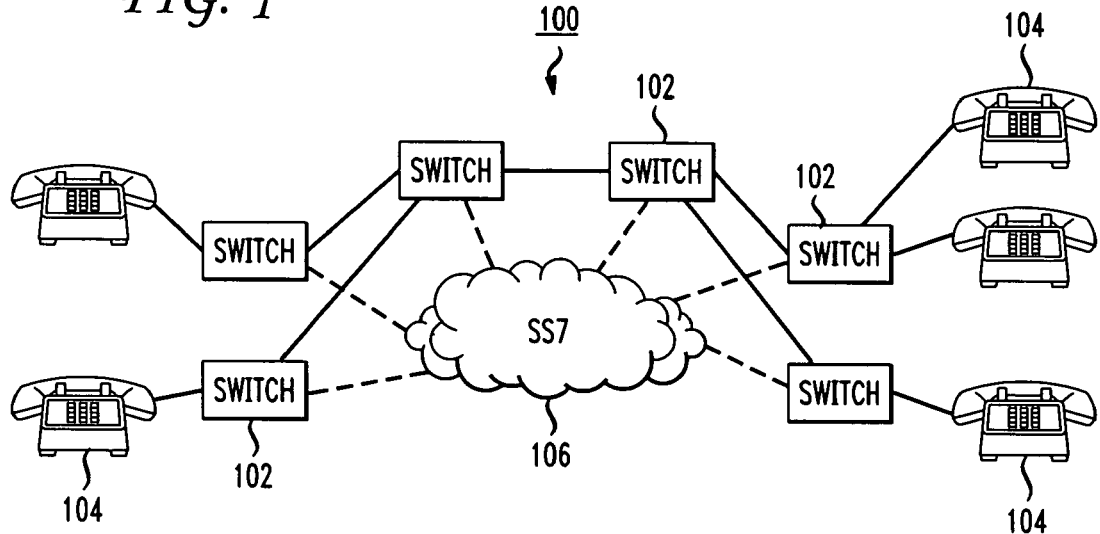
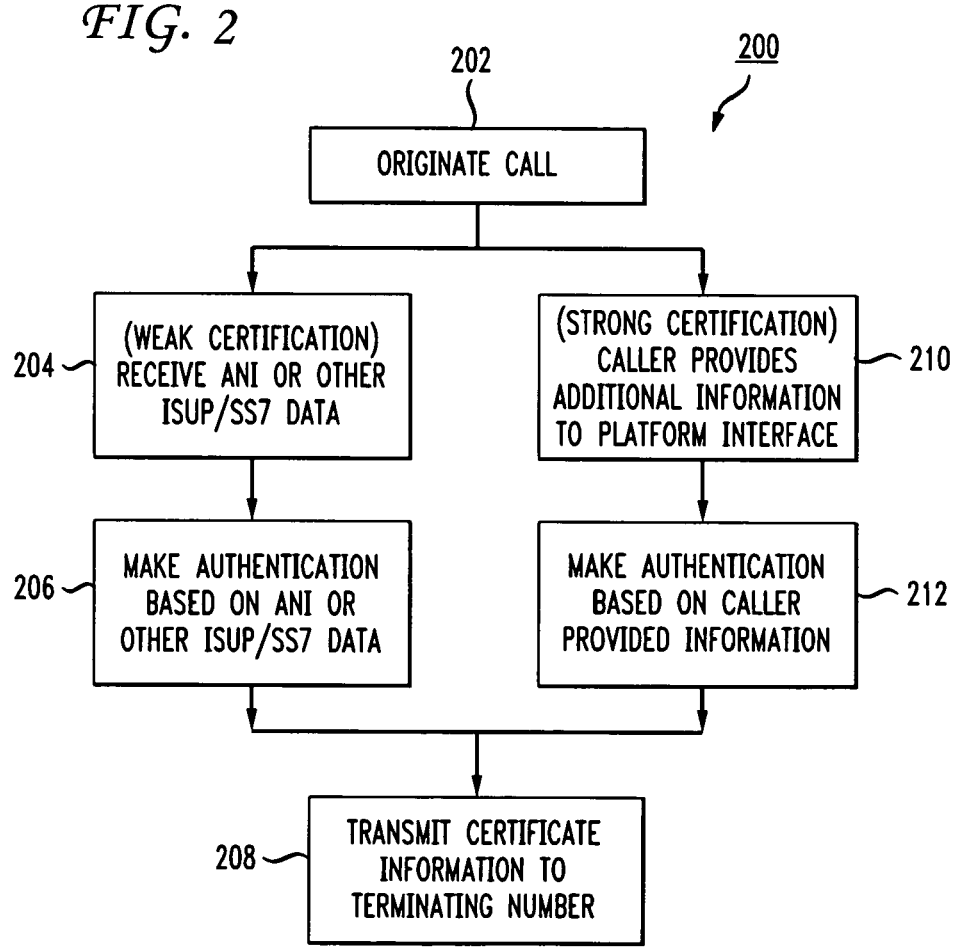

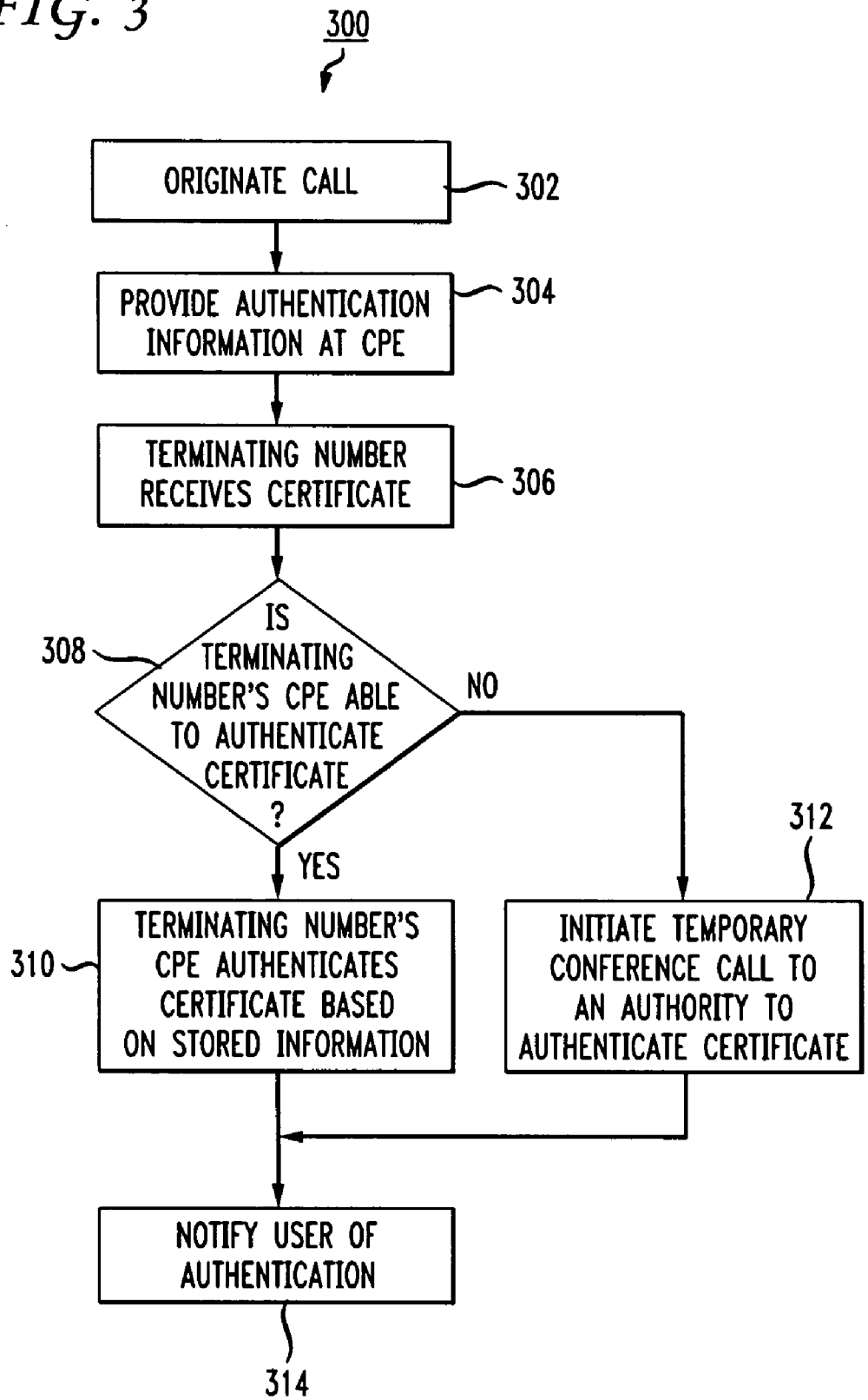

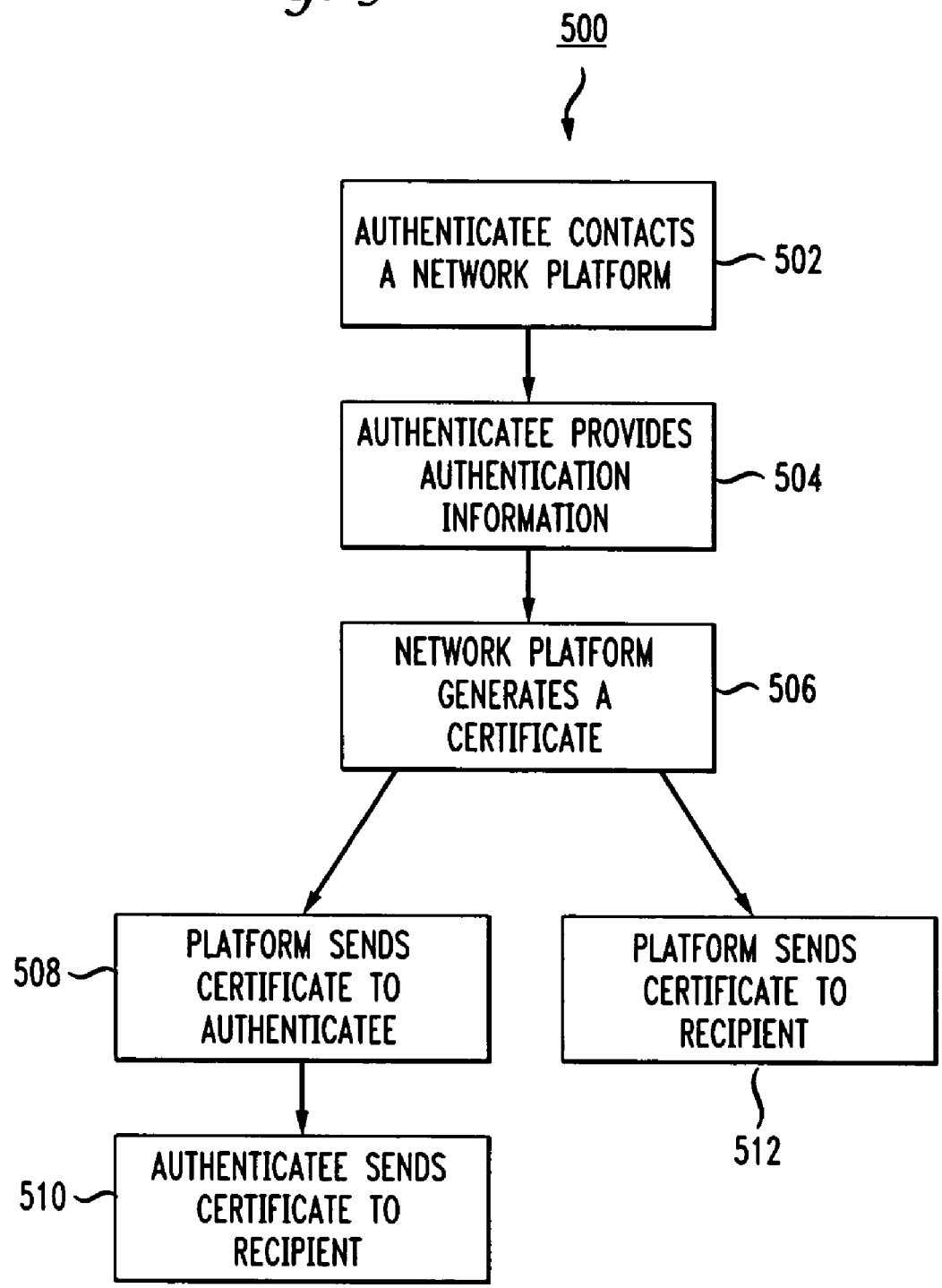

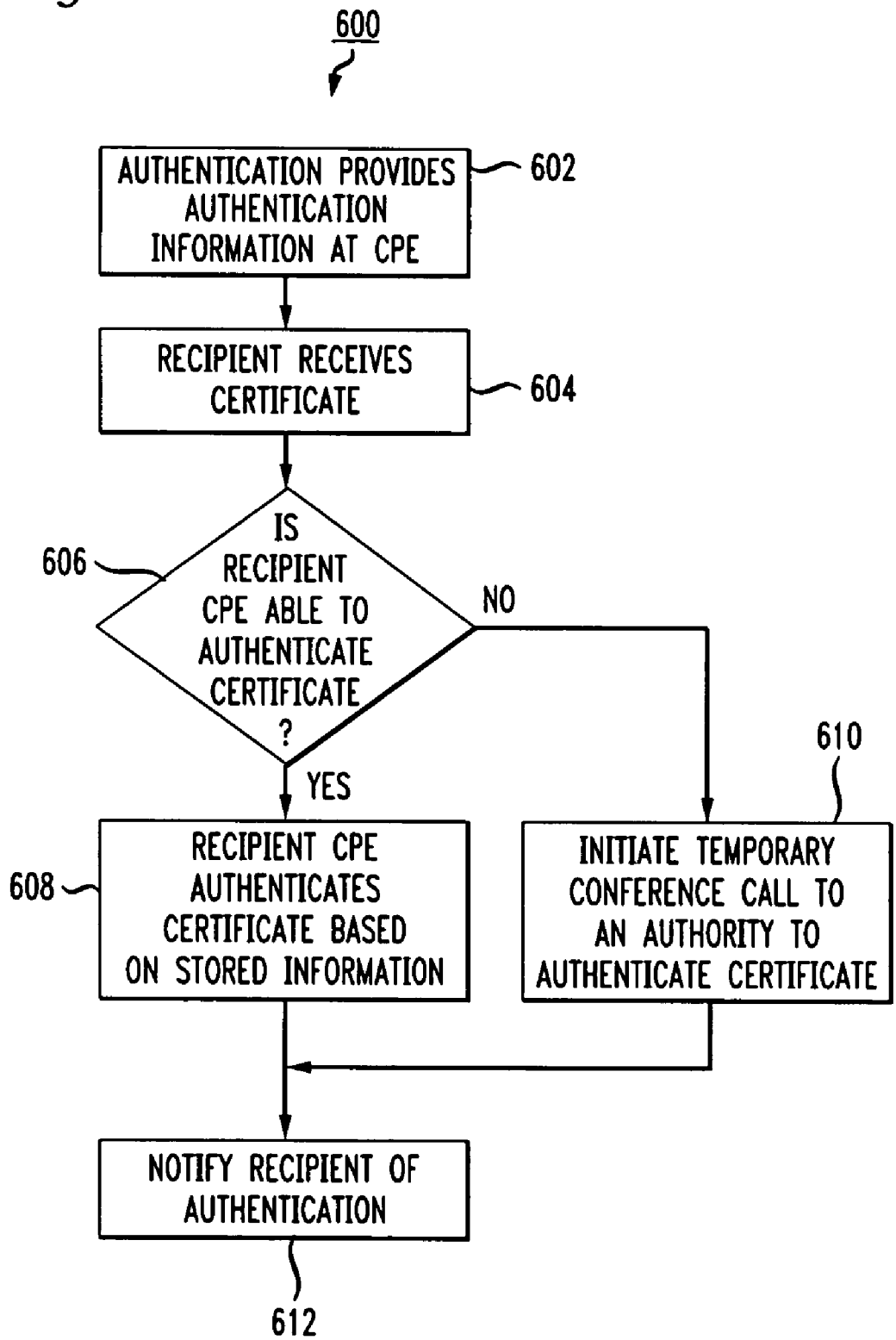

METHOD, ARCHITECTURES AND TECHNIQUE FOR AUTHENTICATION OF TELEPHONE CALLS

BACKGROUND OF THE INVENTION

Due to increased theft and fraud over telephony and Internet services, users may wish to identify or verify an individual or merchant prior to giving out personal information. These problems exist today in the PSTN and are more exacerbated in HFC based telephony. Existing techniques, such as Caller ID, are insufficient because Caller ID indicates the endpoint not the caller. Furthermore, Caller ID may not be available, may be blocked, and may not be accurate. For example, a telephone subscriber may request virtually any identifier as a "Name" for Caller ID purposes. Therefore, the "Name" may not necessarily indicate the identity of the individual.

It is a frequent experience of many people that they receive unsolicited marketing calls at home. If the phone subscriber is successfully enticed into a purchase, the subscriber is often asked to provide personal information such as a credit card number, social security number, PIN numbers, etc. Frequently the caller's phone system does not provide any Caller ID information related to the marketing call through the network. Thus, Caller ID does not allow the subscriber to validate the identity of the calling party or the company. A fraudulent caller may register under a false "Caller ID" name that seems legitimate and may fool some subscribers even if they check the Caller ID transmitted. A subscriber may use Caller Originated Call Trace, however, Call Originated Call Trace may only be employed after the call is ended, requires police authority to obtain the data, and costs money (i.e., the subscriber obtains a subscription to the service). In addition, Call Originated Call Trace does not provide accurate identification for similar reasons to Caller ID.

Consumers who may peruse the Internet for goods/services, but prefer to call when making a purchase may be susceptible to fraud because the consumer is obtaining the vendor's phone number from the web-site(s). However, the phone number listed on the web-site may not be the actual phone number of the vendor. For example, a hacker may, unbeknownst to a website operator or vendor, place a different number on a web-site and thus allow the hacker to, for at least some period of time, intercept calls intended for the vendor. Similarly, vendors may not necessarily know that the caller is who they represent themselves to be.

It is also a frequent experience of vendors, that a person may call and use another person's stolen or fictitious identity information with the intent to defraud the vendor. In addition, the caller may be the actual owner of the credit card used in the transaction, but then after receiving the merchandise, the caller may deny having placed the order.

Therefore, there is a need for a method and system for validating user and/or vendor information.

BRIEF SUMMARY OF THE INVENTION

The present invention relates to a method and system for validating user and/or vendor information. More particularly, one aspect of the present invention relates to a system for authenticating a party of a telephone call. The system includes a telephone network for initiating a telephone from a calling party to a called party and means for receiving authentication information of the identity of the calling party from an authenticatee of an authentication. The means further creates the authentication of the authenticatee. The system also includes means for receiving the authentication at a called party.

In another aspect, the present invention relates to a method for authenticating a call. The method includes originating a call from a calling party to a called party, receiving ANI, ISUP or SS7 data from an authenticatee of an authentication, making an authentication based on the received ANI, ISUP, or SS7 data, and transmitting a certificate indicating authentication of the authenticatee to a recipient.

In another aspect, the present invention relates to a method for authenticating a call. The method includes originating a call from a calling party to a called party, providing authentication information to a platform interface by an authenticatee, making an authentication based on the authenticatee provided authentication information, and transmitting a certificate indicating authentication of the authenticatee to a recipient.

In another aspect, the present invention relates to a method for authenticating a call. The method includes providing authentication information at customer premise equipment by an authenticatee, receiving a certificate indicating authentication of the authenticatee at a recipient, determining whether the customer premise equipment is able to authenticate the certificate, authenticating, by the customer premise equipment, the certificate based on stored information if the customer premise equipment is able to authenticate the certificate, initiating a temporary conference call to an authority to authenticate the certificate if the customer premise equipment is not able to authenticate the certificate, and notifying the recipient of the certificate.

In another aspect, the present invention relates to a method for authenticating a telephone call. The method includes contacting a network platform by an authenticatee, providing authentication information to the network platform by the authenticatee, generating a certificate by the network platform based on the authentication information, sending, by the network platform, the certificate to the authenticatee or a recipient, and sending the certificate to the recipient from the authenticatee if the network platform sends the certificate to the authenticatee.

BRIEF DESCRIPTION OF THE DRAWINGS

A more complete understanding of principles of the present invention may be obtained by reference to the following Detailed Description when taken in conjunction with the accompanying Drawings wherein:

FIG. 1 is a block diagram of an exemplary PSTN system for implementing an embodiment of the present invention;

FIG. 2 is a flow diagram illustrating a method of authenticating a party via a network platform in a PSTN system;

FIG. 3 is a flow diagram illustrating a method of authenticating a party via a CPE in a PSTN system;

FIG. 5 is a flow diagram illustrating a method of authenticating a party via a network platform in an HFC system; and FIG. 6 is a flow diagram illustrating a method of authenticating a party via a CPE in an HFC system.

DETAILED DESCRIPTION OF THE INVENTION

Figure 4:
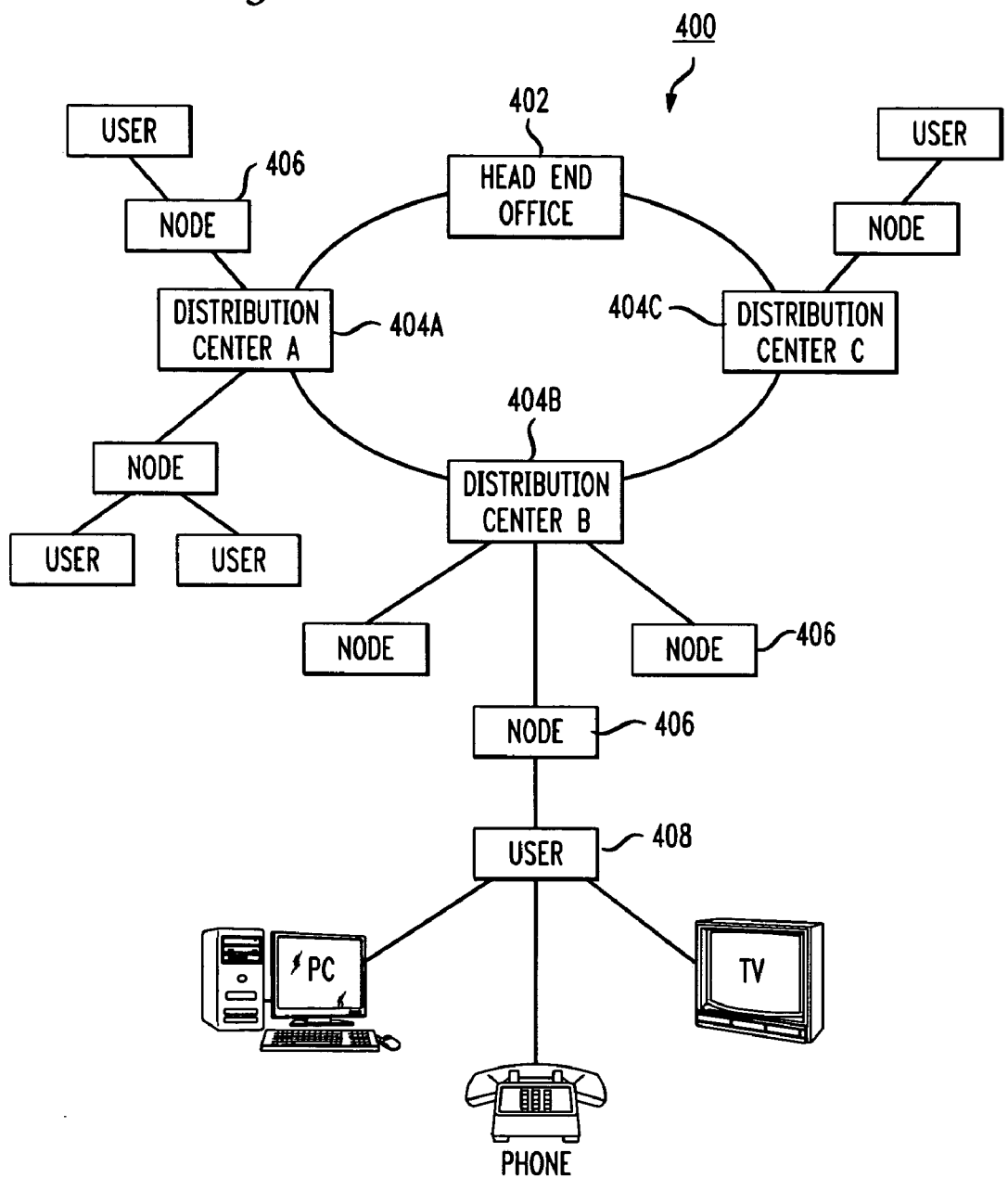
FIG. 4 is a block diagram illustrating an exemplary HFC system for implementing an embodiment of the present invention.

In accordance with some embodiments, users may be able to authenticate the party at the other end of the telephone call. Importantly, these techniques may still allow telephone sales operations to conceal their originating number (which is often desirable), but also allow a customer to validate the other party's identity. It should be noted that embodiments of the present invention are also applicable to any data service such as banking, medical recording, etc.

The present invention may be implemented in various types of networks, such as HFC based telephony networks and PSTN networks. In both cases, existing customer premise equipment (CPE) may be used to inform the recipient of the authentication. The various embodiments provide the ability for either the calling party or called party to receive an authentication or certification (e.g., form of Digital Certificate) from the other party of a telephone call. This certificate may also be digitally signed by a certifying authority.

Referring now to FIG. 1, a block diagram of a Public Switched Telephone Network (PSTN) system is illustrated. The PSTN system 100 is a mature global network that carries voice and low-speed data traffic. The PSTN includes a sophisticated network of voice switches 102 that are used as network nodes to connect telephone handsets 104 worldwide. In the PSTN system 100, voice calls flow from a telephone handset 104 over access lines to a voice switch 102. At the switch 102, voice calls are digitized and multiple voice streams are multiplexed onto trunk lines such as T1s, T3s, or OC-3s. Trunk lines may be used to interconnect switches 102 and are sometimes used to connect to Private Branch Exchanges (PBXs) at corporations or campuses that handle many internal phone lines.

The PSTN system 100 also operates with a Signaling System No. 7 (SS7) signaling network 106, which exists to support worldwide voice traffic (over the PSTN and packet-networks). The SS7 network 106 is physically and functionally independent of the PSTN system 100. Whereas the PSTN system 100 handles traffic transport (carrying voice and data traffic), the SS7 network 106 is an out-of-band signaling network that carries the signaling information necessary for the set-up, teardown and billing of calls on the PSTN system 100. The SS7 network 106 connects to voice switches 102 and instructs the switches 102 what to do with each call, and connects to billing centers.

In a PSTN environment, authentication of the identity of either a calling party or a called party may be implemented via a network platform or Customer Premise Equipment (CPE). One skilled in the art would readily understand that portions of embodiments of the present invention may be implemented throughout the PSTN environment and/or CPE, or alternatively implemented at a specific portion or portions of the PSTN environment and/or CPE. In the PSTN network platform implementation, the party providing their certificate should be registered with the service in order to provide certification to others. Although the following description is related to wired networks, the present invention is equally applicable to wireless networks. In addition, the certification in the following description relates to a calling party providing authentication to a called party, however the present invention may also be utilized to provide authentication from a called party to a calling party.

Referring now to FIG. 2, a flow diagram of weak and strong certification utilizing the network platform implementation is illustrated. The method 200 begins at step 202, with a call originated by a calling party. In this implementation the calling party originates the call through a network platform that provides the certification service (unless the service is applied ubiquitously throughout the network). Either weak certification or strong certification may be made using the network platform. If, for example, weak certification is desired, then at step 204, the network platform receives an Automatic Number Identification (ANI) or other Integrated Services Digital Network User Part (ISUP)/SS7 data from an authenticatee, in this case the calling party. The network platform, at step 206, makes an authentication based on the received ANI or other ISUP/SS7 data. At step 208, the certificate is transmitted to a recipient at the terminating number in addition to other information (e.g., Caller ID if present). The certificate provides the authentication of the authenticatee and/or the level of authentication (e.g., weak or strong).

If a strong certification is desired, then at step 210, the authenticatee provides additional information to a platform. The additional information may be real-time or provisioned (i.e., entered once or on a call-by-call basis). The additional information may be provided via Dual-Tone Multi-Frequency (DTMF), Automated Speech Recognition (ASR), or other signaling (e.g., PBXs, Integrated Services Digital Network (ISDN), etc.). At step 212, an authentication is made based on the authenticatee provided information. Similarly to weak certification, the certificate is transmitted to the recipient at step 208. In some embodiments, it is possible to receive both weak and strong certifications at the same time or to check the weak certification against the strong certification. In some embodiments, it may also be possible to check the certification against the existing caller ID information and send only an indication to the recipient that the caller ID information is correct. The manner in which the recipient receives and interprets this certificate and the type of information is discussed in detail below.

In an another embodiment of the present invention, as illustrated in FIG. 3, authentication of the authenticatee may be provided without network support. In this case, specific CPE on both the originating and terminating ends of the call is required. At step 302 a call is originated from a calling party. At step 304, the authenticatee, which may be either the called party or the calling party, provides authentication information at the CPE. The authentication information may be in the form of a login, password, SecureID, digital signature, etc. The CPE may be utilized by one user or shared with other users. At step 306, the recipient receives the certificate from the authenticatee. The transmission of the certificate may be inband and received on a CPE of the recipient. A determination is made at step 308 regarding whether the recipient CPE is able to authenticate the transmitted certificate. If the recipient CPE is capable of authenticating the certificate, then at step 310, The CPE authenticates the certificate, based on stored information. Alternatively, if the recipient CPE is not able to authenticate the certificate, then at step 312, the CPE may initiate a temporary conference call to an authority to either pass the certificate for authorization or to obtain certificate public key(s). This second connection may also be used to obtain a private key for reading the certificate, or obtaining a private encryption key if the parties desire to encrypt the conversation. At step 314, after the certificate is authenticated, the CPE may notify the recipient by various methods such as a tone, recorded message, or release of media/voice path so the conversation may ensue.

As illustrated in both FIGS. 2 and 3, certificate information is transmitted to the recipient thereby notifying the recipient of the authentication. As previously noted, the recipient may be either the called party or the calling party, depending on which party desires identity authentication. The certificate information may be displayed to the recipient on traditional Caller ID equipment. For example, a name followed by a special reserved symbol (e.g., an asterisk) may indicate the certificate information or that the originator information has been authenticated. For instance, when a user receives a name or other indicia, followed by the reserved symbol, then the user is assured that the name or other indicia is authentic. Alternatively, a reserved code number (that is also publicly published with a description of the owner) may be displayed to the recipient. The reserved code number need not be the phone number and may be much shorter or appended to the calling phone number. The recipient may then look up the special code in the publicly published directory. For example, the special code may indicate that the recipient may, at any time during the call, press "#code" and receive an authentication response from the network platform. For example, when the user presses "#code", the network platform may respond to the entered code with a verbal announcement of the company and address. Although the preferred embodiment has been described as utilizing a verbal announcement that indicates the company name and address, a variety of other options may be utilized to indicate an authentication to the recipient such as a tonal or data response from the network platform.

In yet another embodiment, a special CPE may be designed to include certificate information and certificate signers. Alternatively, the CPE may have an Internet connection in order to authenticate an originator. The recipient CPE may communicate with a network platform or directly with the originator CPE to indicate acceptance.

The authentication of an originator of the present invention may also be implemented in Hybrid Fiber Coax (HFC) environments as illustrated in FIG. 4. The HFC network 400 provides a way of delivering video, voice telephony, data, and other interactive services over coaxial and fiber optic cables. The HFC network 400 includes a headend office 402, at least one distribution center 404, and nodes 406. The headend office 402 receives information such as television signals, Internet packets, streaming media, etc. and delivers them through a SONET ring to distribution centers 404. The distribution centers 404 then send the signals to fiber nodes 406, which convert the optical signals to electrical signals and redistributes them on coaxial cables to users 408. The user 408 may implement a network interface unit (not shown) to send the appropriate signals to the appropriate devices (i.e. television, computer, telephone). As previously mentioned, various portions of embodiments of the present invention may be implemented throughout the network and/or CPE.

Similar to the PSTN implementation shown in FIGS. 1–3, HFC systems may utilize a network platform or CPEs to authenticate an authenticatee. The network platform presents a Network Certifying Authority (CA) "signed" certificate to the recipient. However, if a Network CA "signed" certificate is not necessary, then the CPE implementation may be utilized.

Referring now to FIG. 5, a flow diagram illustrating the authentication of an authenticatee (calling party or called party) utilizing a network platform is shown. The calling party may wish to send authentication to the called party, and therefore the calling party would be the authenticatee. Alternatively, the called party may desire to send authentication to the calling party and, in this case, the called party would be the authenticatee. Because the HFC environment signaling by the CPE directly to the network may happen anytime during a call, there is no requirement to initially set up a call through a particular network platform. At step 502, the authenticatee contacts the network platform and, at step 504, provides authentication information. At step 506, the network platform generates a certificate regarding the authentication of the authenticatee. The network platform may, at step 508, send the certificate to the authenticatee.

The originator, at step 510, sends the received certificate on to the recipient. In contrast, the network platform may instead send the certificate to the recipient at step 512. In either case, the certificate is digitally signed by the Network CA.

In another embodiment of the present invention, as illustrated in FIG. 6, authentication of the authenticatee may be provided without network support. In this case, CPEs on both the originating and terminating ends of the call is required. At step 602, the authenticatee provides authentication information at a CPE. As previously described, the authentication information may be in the form of a login, password, SecureID, digital signature, etc. At step 604, the recipient receives the certificate from the authenticatee. A determination is made at step 606 regarding whether the recipient CPE is able to authenticate the transmitted certificate. If the recipient CPE is capable of authenticating the certificate, then at step 508, the CPE authenticates the certificate, based on stored information. If the recipient CPE is not able to authenticate the certificate, then at step 610, the CPE may initiate a temporary conference call to an authority to either pass the certificate for authorization or to obtain certificate public key(s). This second connection may also be used to obtain a private key for reading the certificate, or to obtain a private encryption key if the parties desire to encrypt the conversation. At step 612, after the certificate is authenticated, the CPE may notify the recipient by various methods as previously mentioned.

Although the above embodiments have been described with reference to specific networks, it will be understood by one skilled in the art that embodiments of the present invention may be implemented in various networks, such as an IP network. The previous description is of several embodiments for implementing this invention, and the scope of the invention should not necessarily be limited solely by these descriptions. The scope of the present invention is instead defined by the following claims.

What is claimed is:

1. A method for authenticating a call, the method comprising:
    providing authentication information at customer premise equipment by an authenticatee;
    receiving a certificate indicating authentication of the authenticatee at a recipient;
    determining whether the customer premise equipment is able to authenticate the certificate;
    authenticating, by the customer premise equipment, the certificate based on stored information if the premise equipment is able to authenticate the certificate;
    initiating a temporary conference call to an authority to authenticate the certificate if the customer premise equipment is not able to authenticate the certificate; and
    notifying the recipient of the certificate.

2. The method of claim 1, further comprising, prior to the providing step, the step of originating a call from a calling party to a called party.

3. The method of claim 2, wherein the authenticatee is the calling party.

* * * * *

UNITED STATES PATENT AND TRADEMARK OFFICE
CERTIFICATE OF CORRECTION

PATENT NO. : 7,239,688 B1
APPLICATION NO. : 10/831036
DATED : July 3, 2007
INVENTOR(S) : Robert Sayko et al.

It is certified that error appears in the above-identified patent and that said Letters Patent is hereby corrected as shown below:

TITLE PAGE, ITEM (75) INVENTORS:
"Paul J. Fellingham, Holmdel, New Jersey (US)" should be added to the list of Inventors.

Signed and Sealed this

Sixth Day of May, 2008

JON W. DUDAS
*Director of the United States Patent and Trademark Office*